US009278364B2

(12) United States Patent
Zhou et al.

(10) Patent No.: US 9,278,364 B2
(45) Date of Patent: Mar. 8, 2016

(54) BUTTON WATER-SAVING SHOWER

(75) Inventors: Huasong Zhou, Xiamen (CN); Wenxing Chen, Xiamen (CN); Renzhong Li, Xiamen (CN); Bin Chen, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 664 days.

(21) Appl. No.: 13/580,011

(22) PCT Filed: Mar. 2, 2011

(86) PCT No.: PCT/CN2011/071450
§ 371 (c)(1), (2), (4) Date: Aug. 20, 2012

(87) PCT Pub. No.: WO2011/107025
PCT Pub. Date: Sep. 9, 2011

(65) Prior Publication Data

US 2012/0312902 A1 Dec. 13, 2012

(30) Foreign Application Priority Data

Mar. 2, 2010 (CN) .......................... 2010 1 0116060
Mar. 2, 2010 (CN) ...................... 2010 2 0121383 U

(51) Int. Cl.
*A62C 31/00* (2006.01)
*B05B 1/14* (2006.01)
(Continued)

(52) U.S. Cl.
CPC ............. *B05B 1/1636* (2013.01); *B05B 1/1645* (2013.01); *B05B 1/1654* (2013.01); *B05B 1/1663* (2013.01); *B05B 12/002* (2013.01); *B05B 1/18* (2013.01)

(58) Field of Classification Search
CPC ...... B05B 1/1663; B05B 1/18; B05B 1/1645; B05B 1/1654; B05B 12/002; B05B 1/1618
USPC ......... 239/562, 569, 583, 443, 391, 394, 444, 239/446–449, 558, 559, 563, 567; 251/319–324
See application file for complete search history.

(56) References Cited

U.S. PATENT DOCUMENTS 4,629,124 A * 12/1986 Gruber ....................... 239/428.5
4,703,893 A * 11/1987 Gruber .......................... 239/391
(Continued)

FOREIGN PATENT DOCUMENTS

AU 2008202160 A1 12/2009
CN 2279485 Y 4/1998
(Continued)

*Primary Examiner* — Len Tran
*Assistant Examiner* — Alexander Valvis
(74) *Attorney, Agent, or Firm* — Rabin & Berdo, P.C.

(57) ABSTRACT

A button water-saving shower including a shower body and a water-saving mechanism, an inlet passage communicating with a water source and an outlet cavity arranged in the body; the water-saving mechanism is arranged in the body in a vertically sliding manner, and includes a pressing mechanism similar to an automatic ball pen and a floating cover connected to the pressing mechanism; the outlet cavity communicates with the inlet passage and includes at least one inlet hole of which the outlet sectional area is changed along with the vertical movement of the floating cover. The shower can achieve water-saving through a button and achieve switching of outlet functions through a water division unit with ease of use and practicality.

9 Claims, 10 Drawing Sheets

(51) Int. Cl.

| | |
|---|---|
| ***A62C 37/20*** | (2006.01) |
| ***F16K 1/00*** | (2006.01) |
| ***F16K 15/00*** | (2006.01) |
| ***B05B 1/16*** | (2006.01) |
| ***B05B 12/00*** | (2006.01) |
| *B05B 1/18* | (2006.01) |

(56) References Cited

U.S. PATENT DOCUMENTS

| | | | | |
|---|---|---|---|---|
| 5,100,055 | A * | 3/1992 | Rokitenetz et al. | 239/11 |
| 5,109,553 | A * | 5/1992 | Kishimoto | 4/518 |
| 5,433,384 | A * | 7/1995 | Chan et al. | 239/449 |
| 5,690,312 | A * | 11/1997 | Yang | 251/321 |
| 6,622,945 | B1 * | 9/2003 | Wu et al. | 239/443 |
| 7,328,858 | B2 * | 2/2008 | Bosio | 239/444 |
| 7,607,588 | B2 * | 10/2009 | Nobili | 239/68 |
| 8,061,631 | B2 * | 11/2011 | Lev | 239/394 |
| 8,177,147 | B2 * | 5/2012 | Engel | 239/443 |
| 8,695,897 | B2 * | 4/2014 | Engel | 239/443 |
| 2009/0200401 | A1 * | 8/2009 | Esche et al. | 239/525 |
| 2010/0237160 | A1 * | 9/2010 | Miller et al. | 239/1 |

FOREIGN PATENT DOCUMENTS

| | | | |
|---|---|---|---|
| CN | 2396892 | Y | 9/2000 |
| CN | 201040267 | Y | 3/2008 |
| CN | 201150891 | Y | 11/2008 |
| CN | 201618625 | U | 11/2010 |
| EP | 0885660 | A1 | 12/1998 |
| JP | 11138055 | A | 5/1999 |

* cited by examiner

BUTTON WATER-SAVING SHOWER

FIELD OF THE INVENTION

The present invention relates to bathroom accessories, more particularly to a shower which can save water through button.

BACKGROUND OF THE INVENTION

The shower is popularized in people's daily life, and the requirement of shower functions is higher, most of the showers have multiple outlet functions which can switch, the utility model <multi-function outlet structure of the shower> (Chinese patent application number CN20072000685) discloses a shower which only can switch different outlet functions but cannot save water; and the utility model <a water-saving withdrawing shower> (Chinese patent application number CN200720192428.6) discloses a shower which can adjust water volume to save water, but the shower has a single outlet function with low practicality.

SUMMARY OF THE INVENTION

A button water-saving shower is offered in the present invention, which overcomes the defect in the prior art that switching between water-saving and outlet functions cannot be achieved.

The technical proposal to solve the technical matter in the present invention is:

A button water-saving shower, comprises a body and a water-saving mechanism,

An inlet passage communicating with the water resource and an outlet cavity are arranged in the body;

The water-saving mechanism is arranged in the body in a up-and-down sliding manner, and comprises a pressing mechanism similar to the automatic ball pen and a floating cover connected to the pressing mechanism;

The outlet cavity communicates with the inlet passage and comprises at least one inlet hole of which the outlet sectional area is changed along the up-and-down movement of the floating cover.

In a preferred embodiment, the pressing mechanism comprises a button, a middle key and a control component, the button is exposed out of the body to be controlled by the users, a convex button is convexly arranged out of the middle key, the ratchets are convexly arranged at the bottom end of the control component, the middle key is sleeved to the control component, and the convex button is adaptive to the ratchets.

In a preferred embodiment, the water-saving mechanism also comprises a return component arranged between the floating cover and the body.

In a preferred embodiment, the water-saving mechanism also comprises a support cover that is under the floating cover, and the inlet hole passes through the support cover, and the inlet sectional area of the inlet hole is changed along with the change of the relationship of the relative vertical position of the floating cover and the support cover.

In a preferred embodiment, the embossments are convexly arranged on the bottom surface of the floating cover, and the end of the embossment is conical surface, and the embossment is adaptive to the inlet hole.

In a preferred embodiment, also comprises a water division unit arranged in the body and used for switching the outlet functions and an outlet unit, the water division body comprises a swivel that can rotationally connected to the body, and a synchronizing shaft is convexly arranged under the swivel, the synchronizing shaft hermetically and rotationally passes through the body and connects the floating cover with the support cover to drive the synchronous rotation of the floating cover and the support cover, the outlet unit is fixed connected under the body, and the switch of the outlet functions is achieved through the relative rotation between the support cover and the outlet unit.

In a preferred embodiment, a plurality of the water division holes are arranged on the water division unit and are selectively communicated with the inlet holes to switch the outlet function along with the relative rotation between the support cover and the outlet unit.

In a preferred embodiment, the cavity formed between the water division unit and the body is defined as an outlet cavity, the floating cover can be arranged in the outlet cavity in a up-and-down sliding manner, and the support cover is located at the bottom end of the outlet cavity.

In a preferred embodiment, the body also comprises a handle connected with the body, and the inner cavity of the handle is penetrated by the inlet passage.

In a preferred embodiment, the water division body comprises the gasket, the upper water division body, the lower division body which are arranged in the body in sequence to switch the outlet functions.

Compared with the shower at the prior art, the advantages of the button water-saving shower in the present invention are: 1 the outlet switch functions and the water-saving function are combined in the button water-saving shower with complete function and good practicality; 2 a water-saving mechanism is arranged in the body of the shower, in which an automatic ball pen type pressing mechanism is used, the water-saving function can be easily used by pressing the button on the pressing mechanism; 3 the embossments are arranged at the bottom end of the floating cover, and the bottom end of the embossment is a small conical surface, so that the inlet hole will not be entirely blocked off when the embossment is inserted into the inlet hole, and the adjustment of the outlet area can be achieved; 4 the water division unit comprises a swivel that can be rotationally connected to and arranged in the body, a synchronizing shaft is arranged to the swivel to achieve the hermetical and synchronous rotation with the floating cover and the support cover to achieve the switching of the outlet functions; 5 the structure of the button water-saving shower is simple and light, the cooperation of the cavity body, the moving parts, the inlet hole and the water division holes is tight, and fast and effective linkage can be achieved.

REFERENCE SIGN

Body—100; inlet passage—110; outlet cavity—120; inlet hole—121; handle—130; water saving mechanism—200; pressing mechanism—210; button 211; middle key—212; convex button—2121; control component—213; socket slice—2131; floating cover—220; embossment—221; limiting hole—222; return component—230; support cover—240; limiting hole—241; water division unit—300; swivel—310; synchronizing shaft—311; water division hole—320; upper water division body—330; lower water division body—350; gasket—340; first water passing hole 341; second water passing hole 342; third water passing hole 343; outlet unit—400.

DESCRIPTION OF THE PREFERRED EMBODIMENTS

With the following description of the drawings and specific embodiments, the invention shall be further described in details.

According to FIG. 1 to FIG. 12, a button water-saving shower is offered by the preferred embodiment in the present invention.

Figure 1:
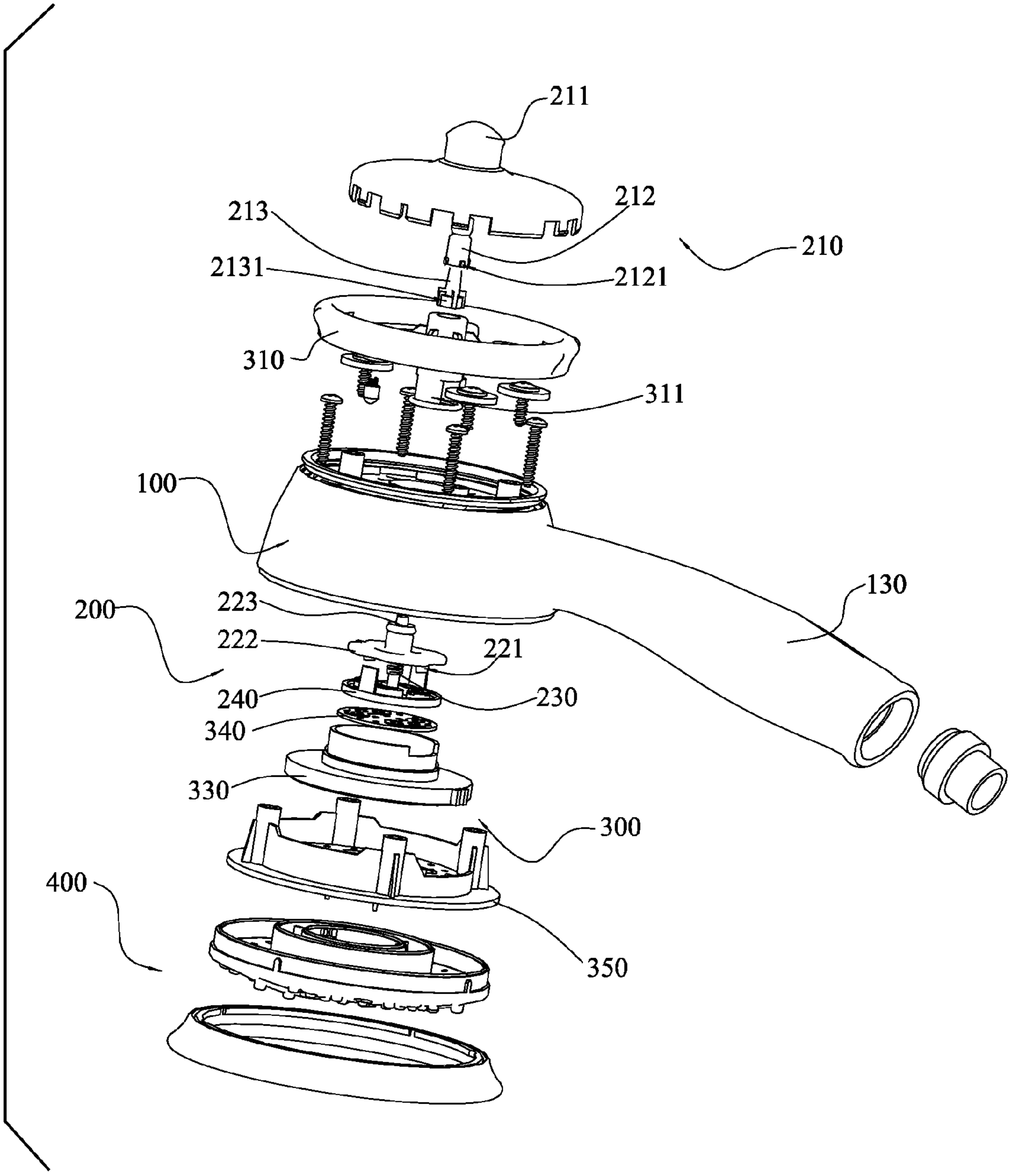
FIG. 1 shows the exploded view of the button water-saving shower.
Figure 2:
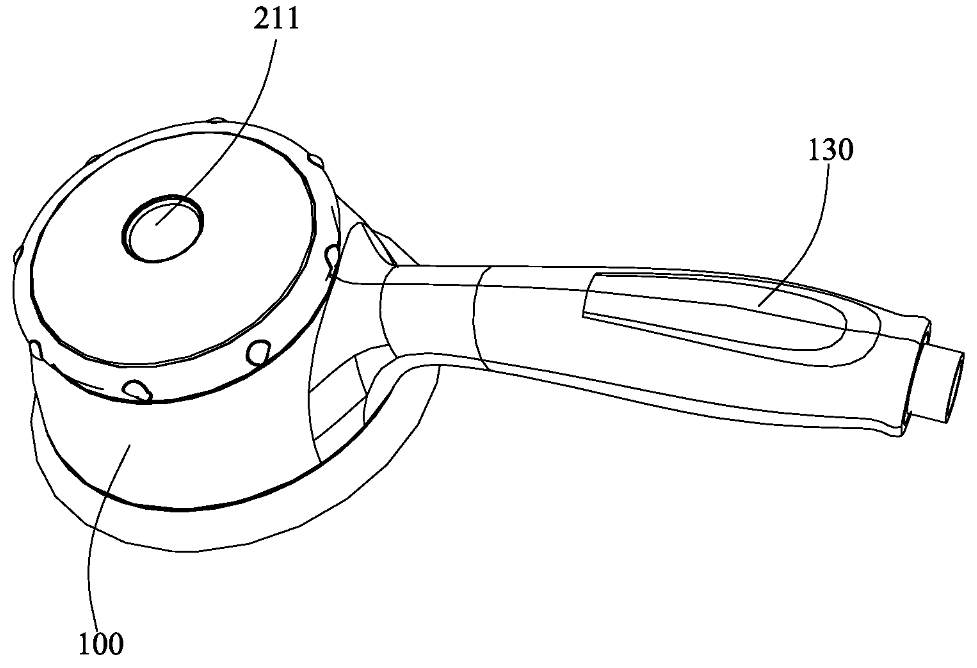
FIG. 2 shows the solid diagram of the button water-saving shower.
Figure 3:
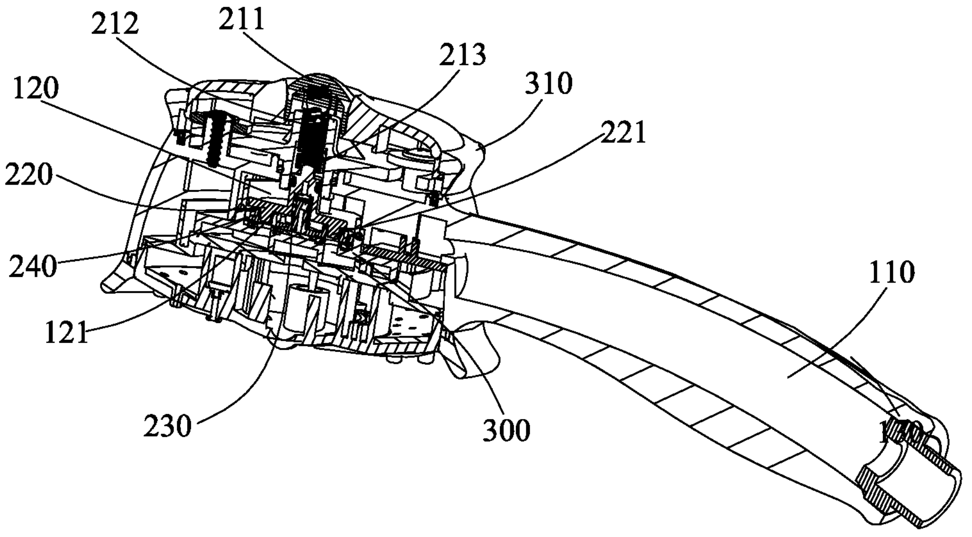
FIG. 3 shows the solid sectional view of the button water-saving shower.

As shown in FIG. 1 to FIG. 3, it comprises a body 100, a water-saving mechanism 200, a water division unit 300 and an outlet unit 400.

The body 100 comprises a handle 130, an inlet passage 100 communicating with the water resource is arranged in the inner cavity of the handle, the cavity formed between the water division unit 300 and the body 100 is defined as the outlet cavity 120, the outlet cavity 120 communicates with the inlet passage 110, and comprises two inlet holes 121.

The water-saving mechanism 200 can be arranged in the body 100 in a up-and-down sliding manner, and it comprises a pressing mechanism 210, a floating cover 220, a return component 230 and a support cover 240, wherein:

The structural principle of the pressing mechanism 210 is similar to the structure of the automatic ball pen, and it comprises a button 211, a middle key 212 and a control component 213, the button 211 is exposed out of the top surface of the body 100, the users press the button to control the button water-saving shower, the middle key 212 is sleeved on the control component 213, and a plurality of convex buttons 2121 in polar array are outward convexly arranged at the bottom end of the middle key 212, the top end of the control component 213 is inserted in the inner cavity of the middle key 212, and a plurality of ratchets 2131 in polar array are outward convexly arranged at the bottom end of the control component 213 to couple with the convex button 2121, and then the sleeving connection of the middle key 212 and the control component 213 is achieved, so that the button 211, the middle key 212 and the control component 231 are linked and coupling together, and the automatic pressing function is achieved.

The floating cover 220 comprises: a cover body 223 and a upward extending splicing part 224, two limiting holes 222 are symmetrically opened at the vicinities of the splicing part 224 and the cover body 223, two embossments 221 are arranged downward at the bottom end of the cover body 223, and the end of the embossments 221 are conical surface and can be adaptively inserted in the inlet hole 121; the floating cover 220 can be arranged in the outlet cavity 120 in a up-and-down sliding manner and be located at the bottom end of the outlet cavity 120 and is connected with the pressing mechanism 210;

The support cover 240 is under the floating cover, a return component 230 is arranged between the support cover 240 and the floating cover 220, in the present embodiment, the return component 230 is a spring which can reset the floating cover 220; the two inlet holes 121 are symmetrically opened on the end face of the support cover 240 and coupling with the water division unit 300, the shape of the inlet holes 121 are similar to oval, the sectional area of the inlet hole 121 changes along the changing of the relationship of the up-and-down relative position between the floating cover 220 and the support cover 240.

Figure 8:
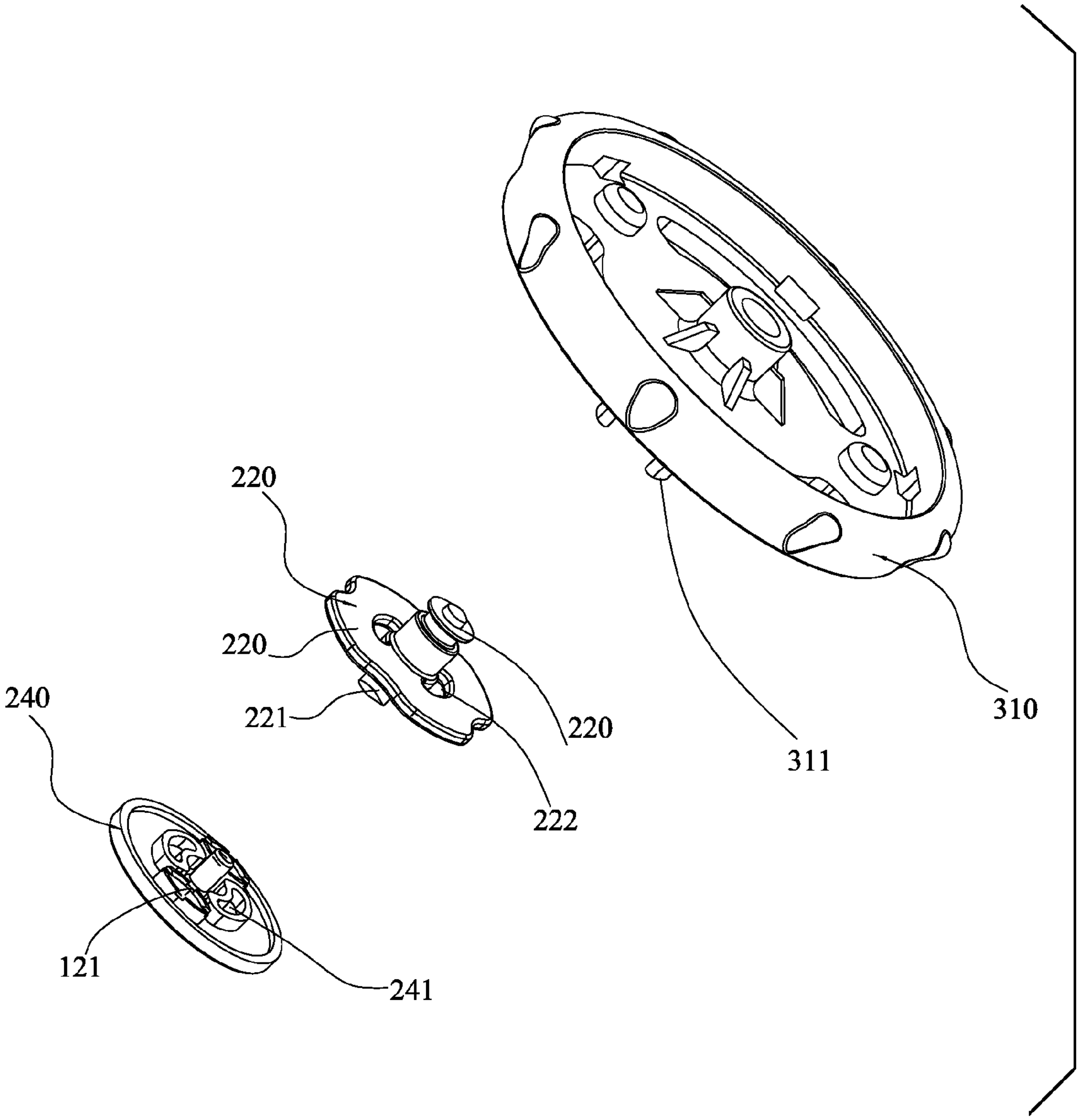
FIG. 8 shows the exploded view that the swivel and the floating cover are coupling with the support cover.
Figure 9:
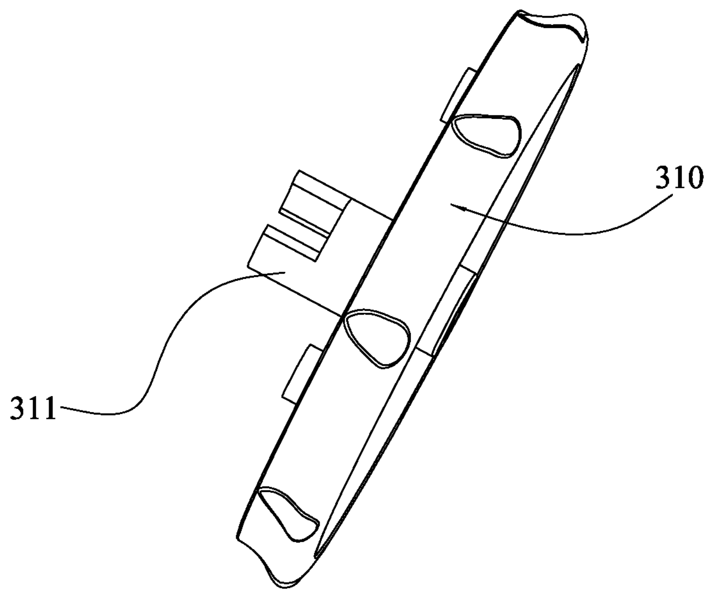
FIG. 9 shows the solid diagram of the swivel.

The water division unit 300 comprises: a gasket 340, an upper water division body 330 and a lower water division body 350 which are arranged in the body in sequence to switch the outlet functions; the outlet unit 400 is fixedly connected under the body 100, in the button water-saving shower in the present embodiment, the outlet functions such as massage water, mixed water, shower water and spraying water are arranged according to actual requirement of application; two groups of water passing holes are symmetrically arranged in the gasket 340, and each group of the water passing holes comprises the first water passing hole 341, the second water passing hole 342 and the third water passing hole 343 of which the hole centers are located on the same circle, wherein, the distance between the first water passing hole 341 and the second water passing hole 342 and the distance between the second water passing hole 342 and the third water passing hole 343 are shorter than the long axis diameter of the inlet hole 121, and the diameters of the water passing hole 341, 342 and 343 are all equal to the short axis diameter of the inlet hole 121; and the water division unit 300 also comprises a swivel 310 that can be rotationally connected to the body 100, and according to FIG. 8 and FIG. 9, a synchronizing shaft 311 is convexly arranged under the swivel 310, and the synchronizing shaft 311 comprises two cambered fillets, and two limiting holes 222 and 241 are symmetrically arranged on the end faces of the floating cover 220 and the support cover 240, wherein, the limiting hole 241 is blind hole; the fillets of the synchronizing shaft 311 can hermetically and rotationally passes through the body 110 and connects the floating cover 220 and the support cover 240 through the limiting holes 222 and 241 to drive the synchronously rotation of the floating cover 220 and the support cover 240.

Figure 10:
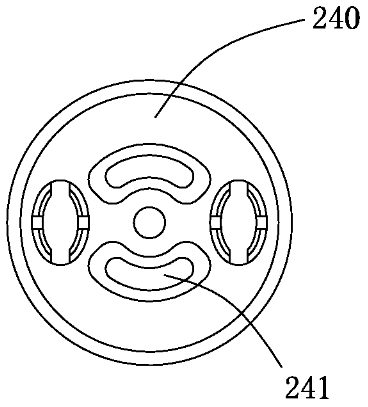
FIG. 10 shows the structural view of the support cover.
Figure 11:
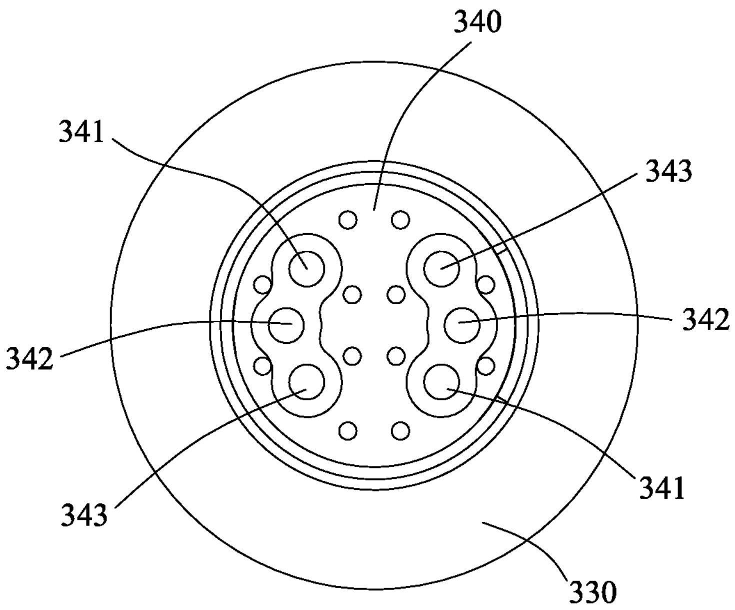
FIG. 11 shows the abridged general view of the fixing state of the water division body and the gasket.
Figure 12:
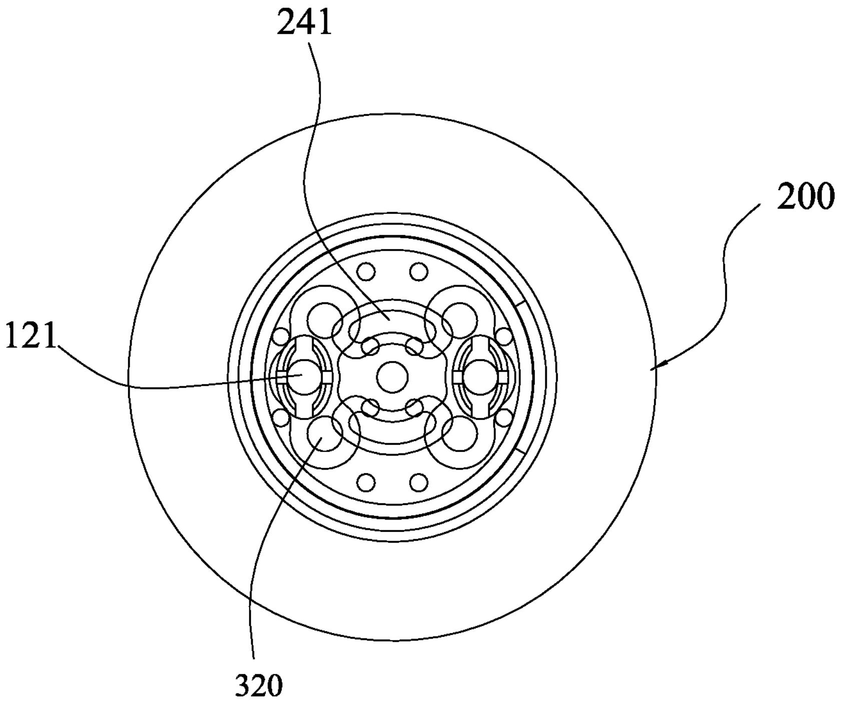
FIG. 12 shows the abridged general view of the coupling state of the support cover and the gasket when shower water comes out of the button water-saving shower.

The main principle of the outlet function switching is: a plurality of water division holes 320 are arranged on the water division body 330 of the water division unit 300 and selectively communicates with the inlet hole 121 along the relative rotation of the support cover 240 and the outlet unit 400 to switch the outlet functions. As shown in FIGS. 10, 11 and 12, the rotation of the support cover 240 is driven by the rotation of the swivel 310, and the inlet hole 121 communicates with the first water passing hole 341, and then massage water comes out of the outlet unit 400 through the water division hole 320; keep turning, and the inlet hole 121 can communicate with the first water passing hole 341 and the second water passing hole 342 simultaneously, and mixed water comes out of the outlet unit 400 through the water division hole 320;

keep turning, and the inlet hole 121 can communicate with the second water passing hole 342, and shower water comes out of the outlet unit 400 through the water division hole 320; keep turning, and the inlet hole 121 can communicate with the second water passing hole 342 and the third water passing hole 343 simultaneously, and mixed water comes out of the outlet unit 400 through the water division hole 320; keep turning, and the inlet hole 121 can communicate with the third water passing hole 343, and spraying water comes out of the outlet unit 400 through the water division hole 320.

Figure 4:
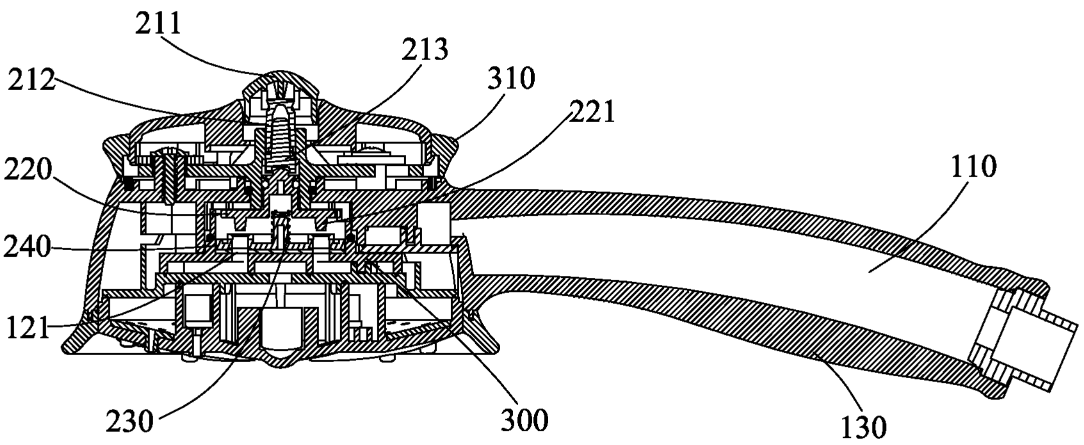
FIG. 4 shows the sectional view of the button water-saving shower when water comes out of the shower normally.
Figure 5:
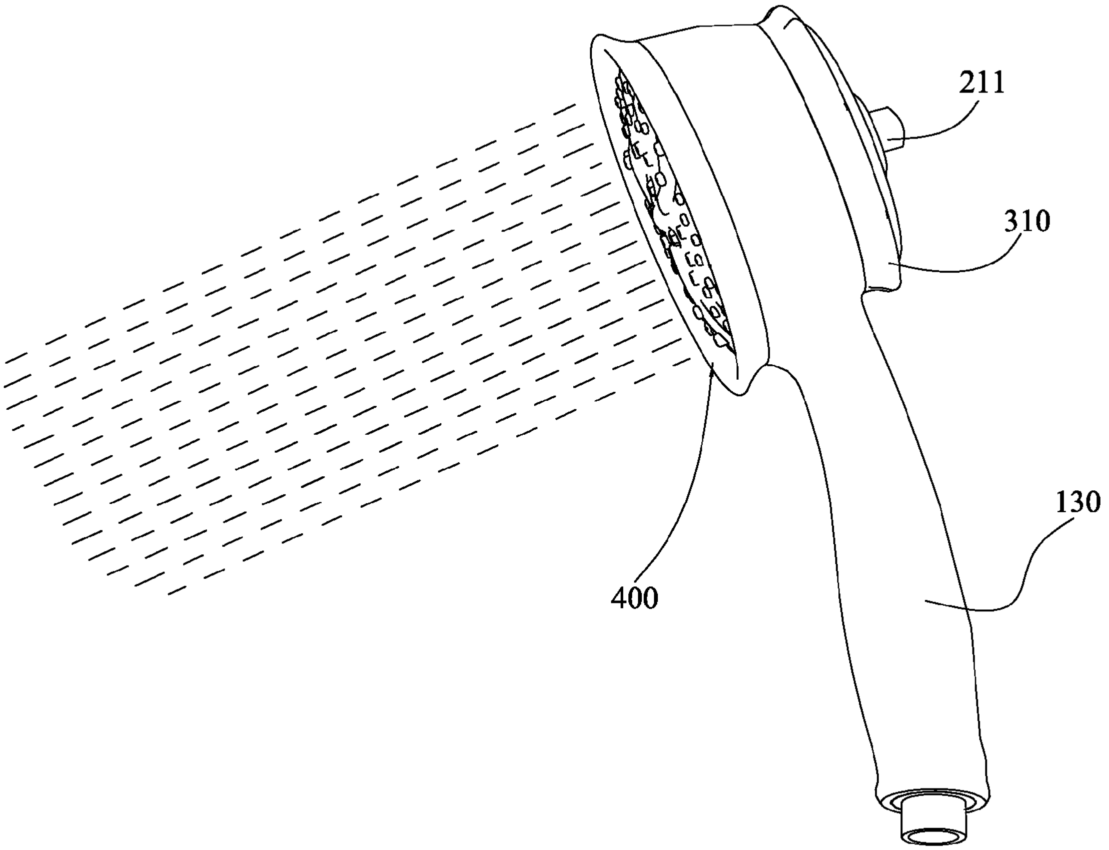
FIG. 5 shows solid diagram of the button water-saving shower when water comes out of the shower normally.

According to FIG. 4 and FIG. 5, they are the abridged general view of the button water-saving shower when water comes out of the shower normally. At this moment, part of the button 211 extends out of the top surface of the body 100, and the floating cover 220 does not move downward and keeps a pre-set distance with the support cover 240, and the embossment 221 of the floating cover is also not inserted in the inlet hole 121 accordingly, and the whole inlet hole 121 communicates with the inlet passage 110, and water flow at this moment is the largest.

Figure 6:
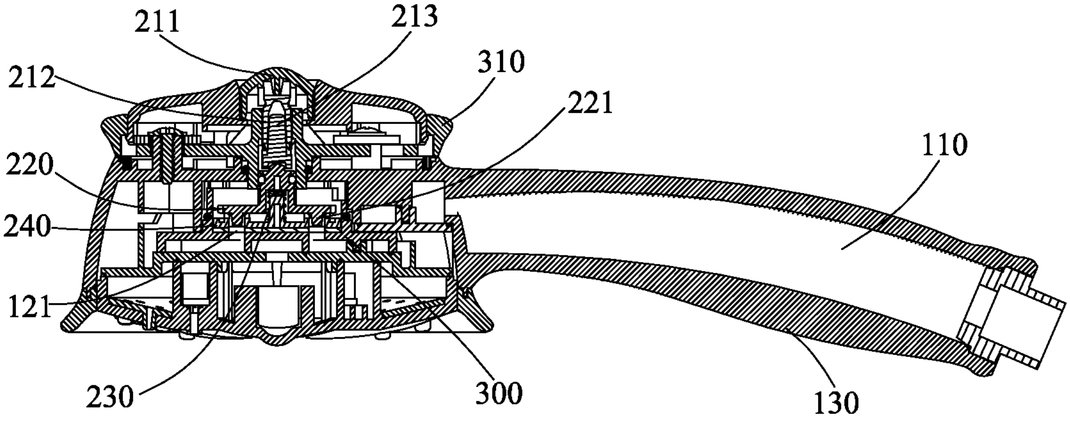
FIG. 6 shows the sectional view of the button water-saving shower when water comes out of the shower at water-saving state.
Figure 7:
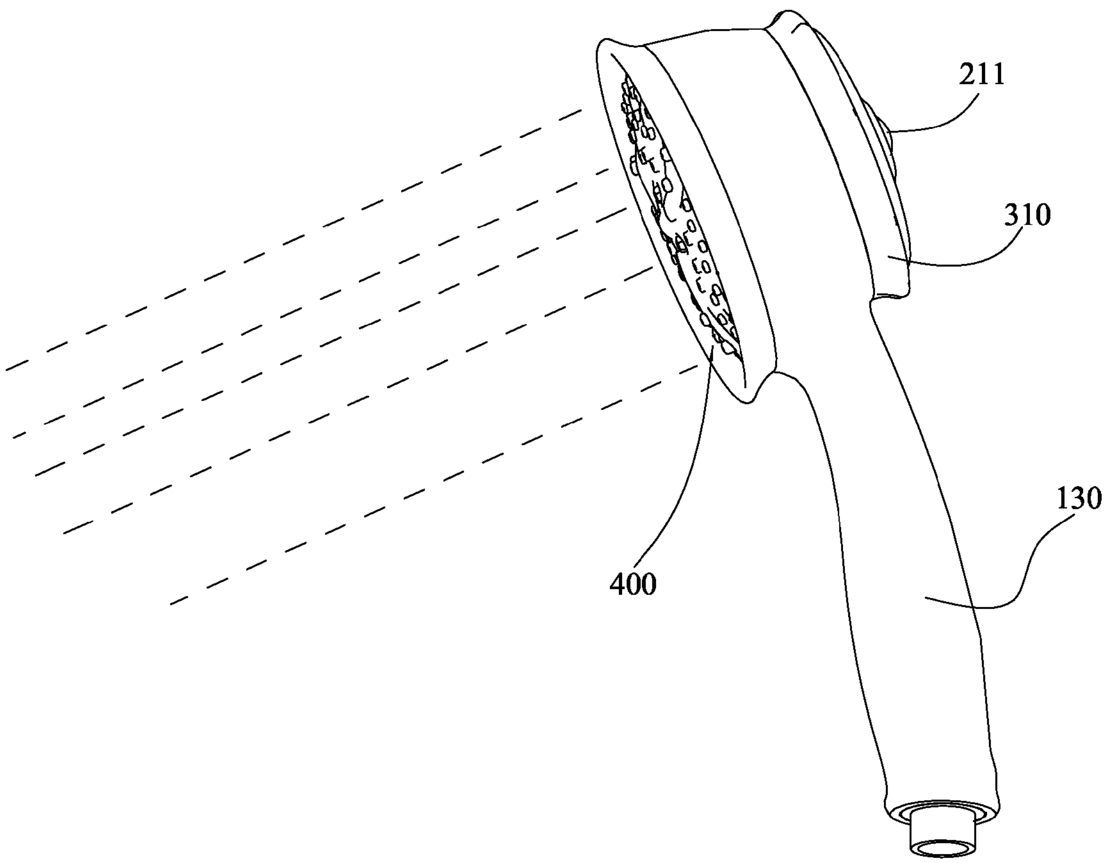
FIG. 7 shows solid diagram of the button water-saving shower when water comes out of the shower at water-saving state.

According to FIG. 6 and FIG. 7, they are the abridged general view of the button water-saving shower when water comes out of the shower at water-saving state. After the button 211 is pressed, the top surface of the button 211 is flush with the top surface of the body 100 and is kept still by the pressing mechanism 210, the control component 213 is against the floating cover 220 and causes the floating cover to move downward until the embossment 221 is inserted into the inlet hole 121, and then the floating cover 220 and the support cover 240 come together, the inlet hole is not blocked off when embossment 221 is inserted into the inlet hole 121 because of the large small conical surface of the embossment 221, just the outlet sectional area of the inlet hole 121 is decreased, and the water volume entering the outlet cavity 121 from the inlet passage 110 is accordingly affected to decrease, and then the water-saving function of the button water-saving shower is achieved.

In the same way, the pressing button 211 is repeatedly pressed, so that the top surface of the pressing button 211 is higher than or flush with the top surface of the body 100 to control the up-and-down sliding of the floating cover 220 in the outlet cavity 120 to increase or decrease the outlet sectional area of the inlet hole 121, so that the shower can be easily switched between normal state and water-saving state.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

INDUSTRIAL APPLICATION

The button water-saving shower of the present invention can achieve the water-saving function through a button and achieve switching of the outlet functions through a water division unit with a simple structure, ease of use and good practicality.

What is claimed is:

1. A button water-saving shower, comprising a body and a water-saving mechanism, wherein, an inlet passage communicating with a water source and an outlet cavity are arranged in the body;

the water-saving mechanism is arranged in the body in a vertically sliding manner, and comprises a pressing mechanism and a floating cover connected to the pressing mechanism;

the outlet cavity communicates with the inlet passage and comprises at least one inlet hole of which the outlet sectional area changes along with vertical movement of the floating cover;

a water division unit arranged in the body and used for switching the outlet functions;

an outlet unit;

a water division body including a swivel configured to be rotationally connected to the body; and a synchronizing shaft arranged under the swivel, the synchronizing shaft rotationally passes through the body and connects the floating cover with the support cover to drive the synchronous rotation of the floating cover and the support cover, the outlet unit is fixedly connected under the body, and the switching of the outlet functions is achieved through relative rotation between the support cover and the outlet unit, wherein:

the water-saving mechanism also comprises a support cover under the floating cover, the inlet hole passes through the support cover, and the inlet sectional area of the inlet hole changes along with the change of the relationship of the relative vertical position of the floating cover and the support cover.

2. A button water-saving shower according to claim 1, wherein, the pressing mechanism comprises a button, a middle key and a control component, the button is exposed from the body to be controlled by the users, a convex button is arranged to protrude from the middle key, ratchets are arranged at a bottom end of the control component, the middle key is sleeved around the control component, and the convex button is configured to cooperate with the ratchets.

3. A button water-saving shower according to claim 1, wherein, the water-saving mechanism also comprises a return component arranged between the floating cover and the body.

4. A button water-saving shower according to claim 1, wherein, an embossment is arranged on a bottom surface of the floating cover, the end of the embossment is a conical surface, and the embossment is configured to cooperate with the inlet hole.

5. A button water-saving shower according to claim 1, wherein, a plurality of water division holes are arranged on the water division unit and selectively communicate with the inlet holes to switch the outlet function along with the relative rotation between the support cover and the outlet unit.

6. A button water-saving shower according to claim 1, wherein, the cavity formed between the water division unit and the body is defined as the outlet cavity, the floating cover can be arranged in the outlet cavity in a vertically sliding manner, and the support cover is located at a bottom end of the outlet cavity.

7. A button water-saving shower according to claim 1, wherein, the body also comprises a handle connected with the body, and an inner cavity of the handle is penetrated by the inlet passage.

8. A button water-saving shower according to claim 5, wherein, the water division body comprises a gasket, an upper water division body, and a lower division body, which are arranged in the body in sequence to switch the outlet functions.

9. A button water-saving shower according to claim 1, wherein, an embossment is arranged on the bottom surface of the floating cover, and an end of the embossment is a conical surface, and the embossment is configured to cooperate with the inlet hole.

* * * * *